(12) United States Patent
Hsu et al.

(10) Patent No.: US 10,514,733 B1
(45) Date of Patent: Dec. 24, 2019

(54) COMPUTER CASE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chin-Pang Hsu, Taipei (TW); Hung-Hsing Chiu, Taipei (TW); Chia-Hsiang Kao, Taipei (TW); Chun-Wei Yeh, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/362,843

(22) Filed: Mar. 25, 2019

(30) Foreign Application Priority Data

Jun. 22, 2018 (CN) .......................... 2018 1 0653137

(51) Int. Cl.
*G06F 1/18* (2006.01)
*G06F 1/20* (2006.01)

(52) U.S. Cl.
CPC .............. *G06F 1/181* (2013.01); *G06F 1/184* (2013.01); *G06F 1/187* (2013.01); *G06F 1/20* (2013.01)

(58) Field of Classification Search
USPC ........................................................ 361/748
See application file for complete search history.

(56) References Cited

U.S. PATENT DOCUMENTS

| 8,717,769 B2* | 5/2014 | Takahashi | G06F 1/1684 |
| | | | 361/679.01 |
| 2010/0265675 A1* | 10/2010 | Aoki | H05K 5/0269 |
| | | | 361/752 |

* cited by examiner

*Primary Examiner* — Andargie M Aychillhum
(74) *Attorney, Agent, or Firm* — McClure, Qualey & Rodack, LLP

(57) ABSTRACT

A computer case including a frame, a motherboard stand and a motherboard extension stand is provided. The frame includes a front plate, a rear plate, a top plate and a bottom plate. The motherboard stand is adjacent to the top plate and the rear plate. The motherboard extension stand is connected to the motherboard stand and has a first position or a second position. When the motherboard extension stand is located at the first position, the motherboard extension stand and the motherboard stand are disposed in parallel, and two sides of the motherboard extension stand are respectively connected to the motherboard stand and the front plate. When the motherboard extension stand is located at the second position, the motherboard extension stand is parallel to the front plate and the rear plate, and located between the front plate and the rear plate.

14 Claims, 18 Drawing Sheets

COMPUTER CASE

This application claims the benefit of People's Republic of China Application No. 201810653137.5, filed Jun. 22, 2018, the disclosure of which is incorporated by reference herein in its entirety.

BACKGROUND OF THE INVENTION

Field of the Invention

The invention relates in general to a computer case, and more particularly to a computer case including a motherboard extension stand whose assembly position is changeable.

Description of the Related Art

Along with the advance in technology, the efficiency of the computer gradually increases, such that the users are satisfied with the multiple requirements. However, the internal devices of a computer are pre-installed by the manufacturer before the computer is delivered to the user. When the user needs to install an additional peripheral device to meet a particular requirement, it is very likely that the user cannot find any suitable area or position for the installation of the additional peripheral device. At the end, the user may need to purchase an additional fixing stand to complete the installation.

SUMMARY OF THE INVENTION

The invention relates to a computer case including a motherboard extension stand whose assembly position is changeable. By changing the assembly position of the motherboard extension stand, the user may install necessary peripheral devices on the motherboard extension stand without using additional fixing stands.

To achieve the above object, the present invention provides a computer case including a frame, a motherboard stand and a motherboard extension stand. The frame includes a front plate, a rear plate, a top plate and a bottom plate. The front plate and the rear plate are disposed oppositely and parallel to each other. The top plate and the bottom plate are disposed oppositely and parallel to each other. The front plate and the rear plate are respectively connected between the top plate and the bottom plate. The motherboard stand is adjacent to the top plate and the rear plate. The motherboard extension stand is connected to the motherboard stand, and has a first position or a second position. When the motherboard extension stand is located at a first position, the motherboard extension stand and the motherboard stand are disposed in parallel, and two sides of the motherboard extension stand are respectively connected to the motherboard stand and the front plate. When the motherboard extension stand is located at a second position, the motherboard extension stand is parallel to the front plate and the rear plate, and located between the front plate and the rear plate.

According to the computer case of the present invention, when the motherboard extension stand is located at the first position, the motherboard extension stand is configured to carry a hard disc or a heat-dissipation device; when the motherboard extension stand is located at the second position, the motherboard extension stand is configured to carry the hard disc and/or the heat-dissipation device.

According to the computer case of the present invention, the motherboard extension stand is rotatably and pivotally connected to the motherboard stand.

According to the computer case of the present invention, the motherboard stand and the motherboard extension stand respectively include a first lapped portion and a second lapped portion bending at lateral sides. The first lapped portion includes a lapped surface. The second lapped portion includes a first surface and a second surface opposite to each other. When the motherboard extension stand is located at the first position, the first surface overlaps lapped surface. When the motherboard extension stand is located at the second position, the second surface overlaps lapped surface.

According to the computer case of the present invention, the computer case further includes an L-shaped shielding plate, the frame defines an accommodation space, and the shielding plate is disposed in the accommodation space and divides the accommodation space into a first space and a second space.

According to the computer case of the present invention, the L-shaped shielding plate includes a horizontal portion and a lateral portion, the horizontal portion, the lateral portion, the bottom plate and the motherboard stand define the first space, a hard disc group is located in the first space, and the bottom plate is further configured to carry the hard disc group.

According to the computer case of the present invention, the shielding plate further includes an engaging portion on the horizontal portion, and the motherboard extension stand further includes a protrusion portion corresponding to the engaging portion. When the motherboard extension stand is located at the first position, the protrusion portion faces the top plate of the frame. When the motherboard extension stand is located at the second position, the protrusion portion faces the bottom plate of the frame, and is disposed in the engaging portion.

According to the computer case of the present invention, the computer case further includes two glass covers respectively disposed on the left side and the right side of the frame and adjacent to the front plate, the rear plate, the top plate and the bottom plate.

According to the computer case of the present invention, when the motherboard extension stand is located at the second position, the motherboard extension stand further includes at least one installation stand parallel to the top plate and the bottom plate for carrying at least one hard disc.

The above and other aspects of the invention will become better understood with regard to the following detailed description of the preferred but non-limiting embodiment(s). The following description is made with reference to the accompanying drawings.

DETAILED DESCRIPTION OF THE INVENTION

It should be noted that although the present invention does not illustrate all possible embodiment, other embodiment not disclosed in the present invention are still applicable. Moreover, the dimension scales used in the accompanying drawings are not based on actual proportion of the product. Therefore, the specification and drawings are for explaining and describing the embodiment only, not for limiting the scope of protection of the present invention. Furthermore, descriptions of the embodiment, such as detailed structures, manufacturing procedures and materials, are for exemplification purpose only, not for limiting the scope of protection of the present invention. Suitable modifications or changes may be made to the structures and procedures of the embodiment to meet actual needs without breaching the spirit of the present invention. Designations common to the accompanying drawings are used to indicate identical or similar elements.

Figure 1A:
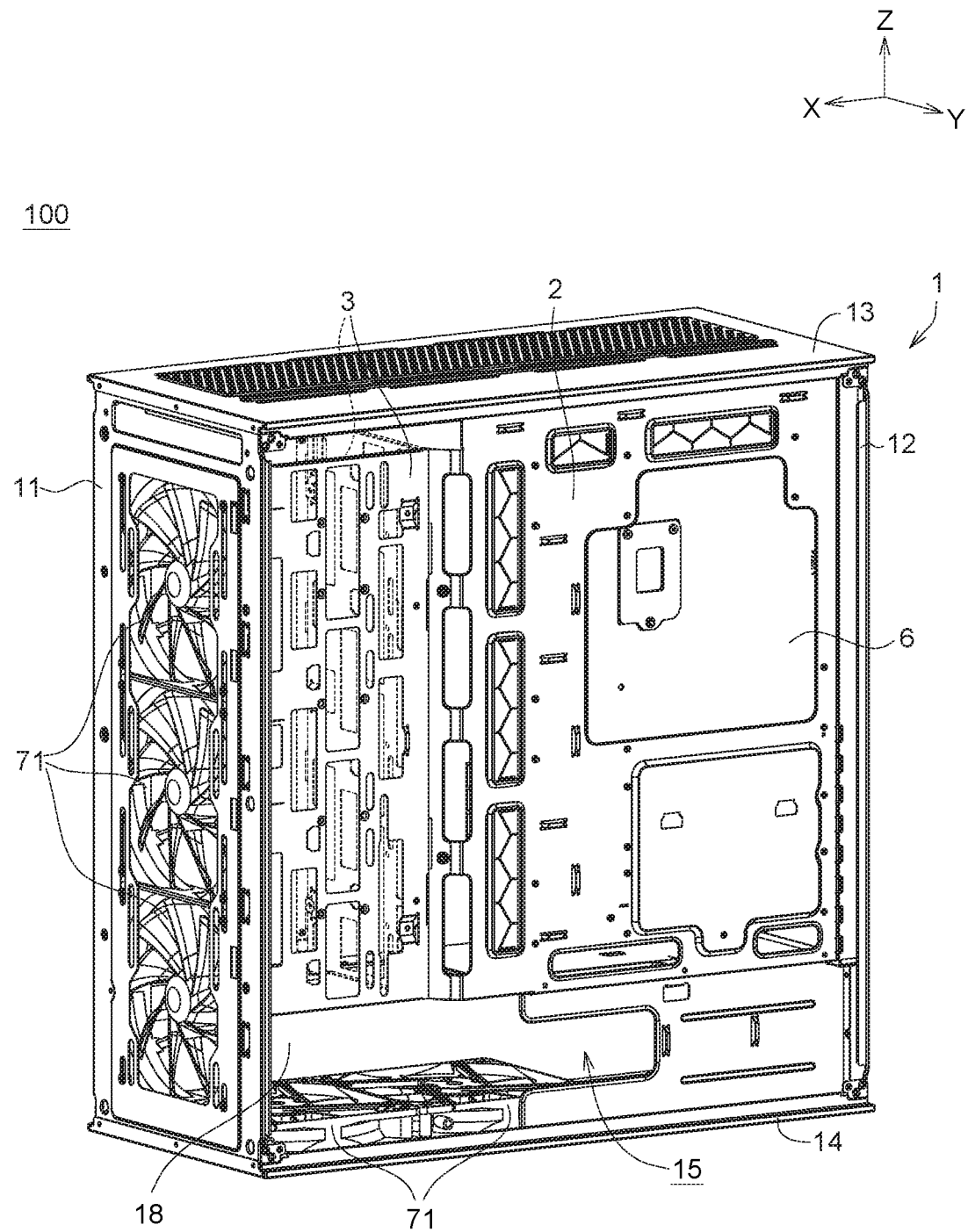
FIG. 1A is a schematic diagram of a computer case viewed from a view-angle according to an embodiment of the invention.
Figure 1B:
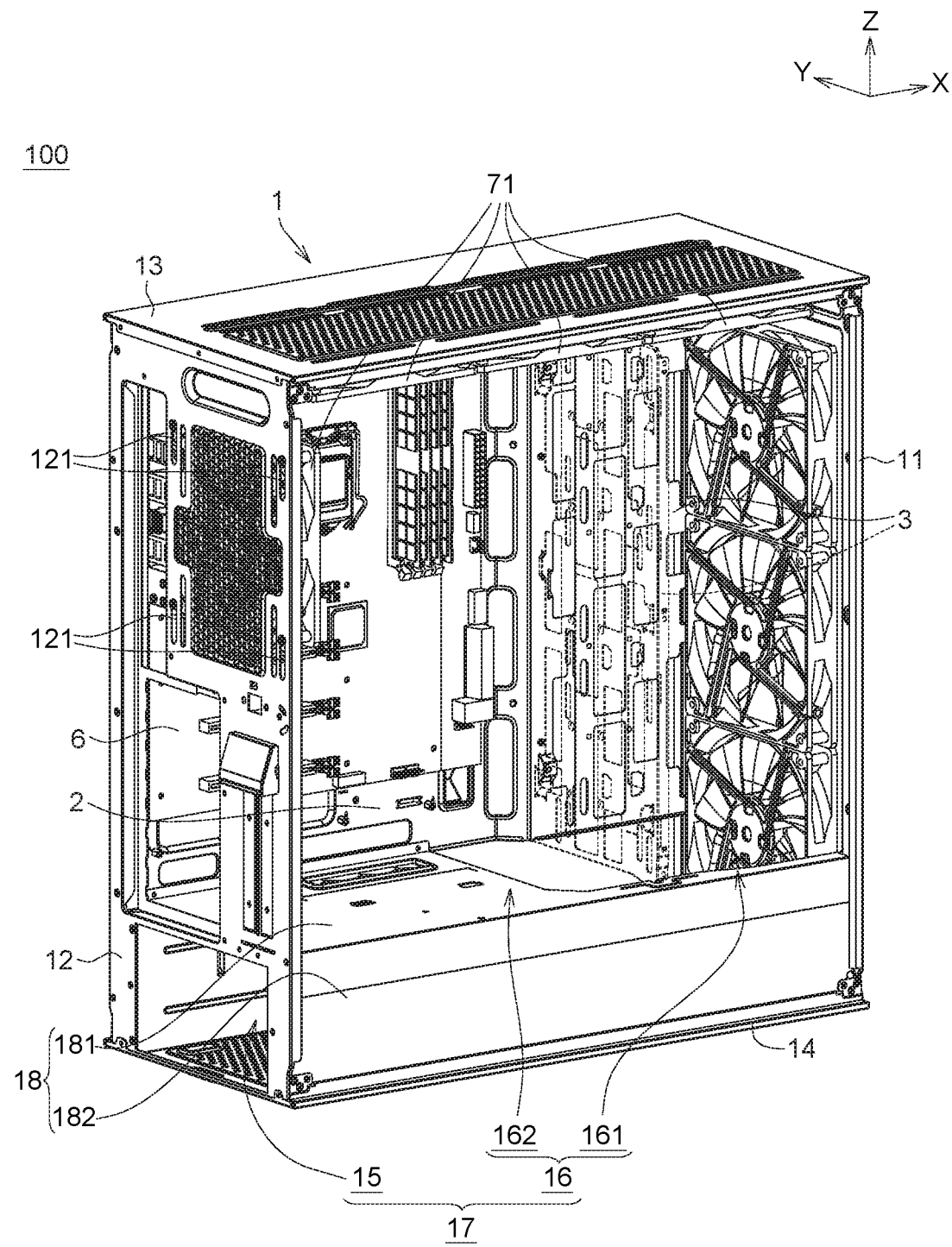
FIG. 1B is a schematic diagram of the computer case of FIG. 1A viewed from another view-angle.
Figure 1C:
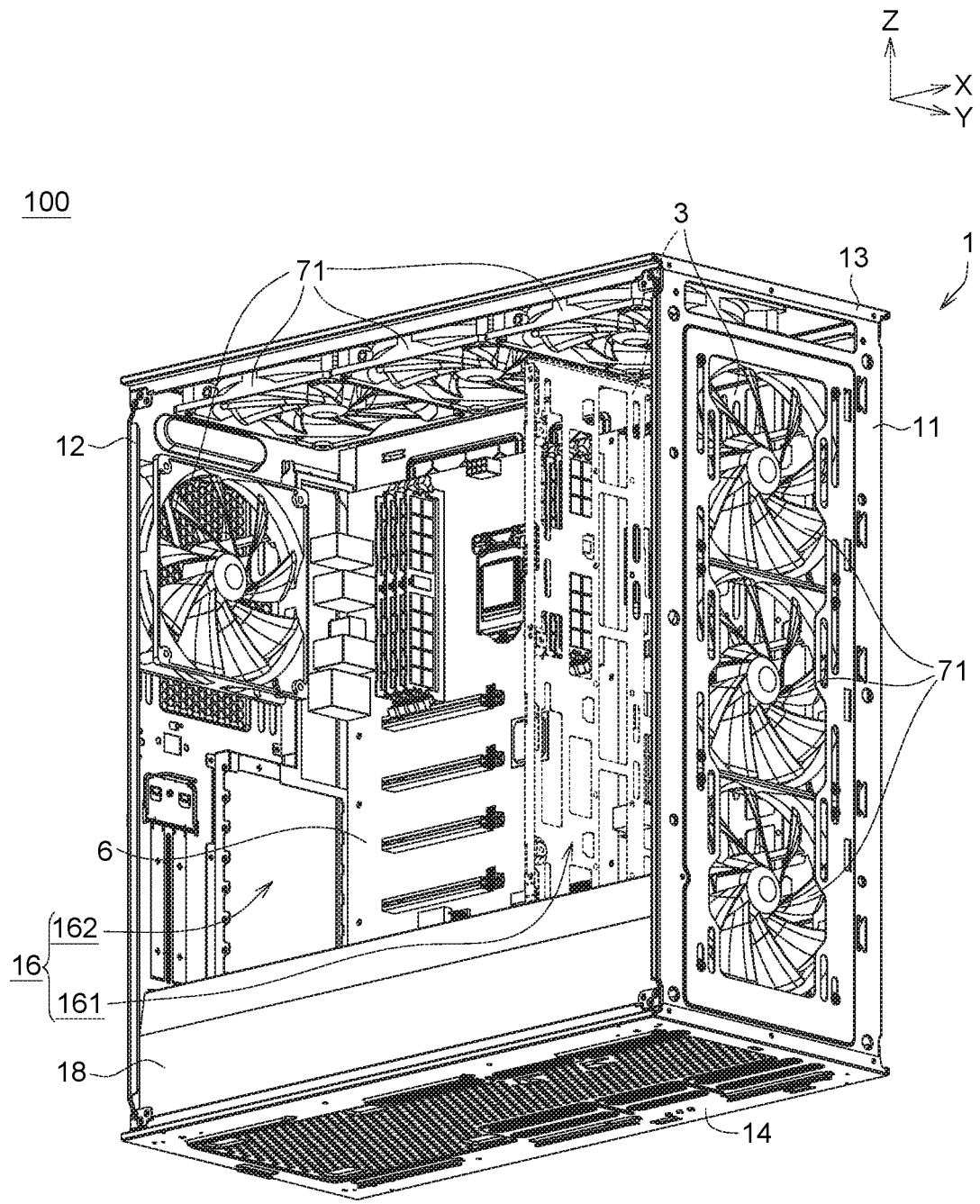
FIG. 1C is a schematic diagram of the computer case of FIG. 1A viewed from another view-angle.

FIG. 1A is a schematic diagram of a computer case 100 viewed from a view-angle according to an embodiment of the invention. FIG. 1B is a schematic diagram of the computer case 100 of FIG. 1A viewed from another view-angle. FIG. 1C is a schematic diagram of the computer case 100 of FIG. 1A viewed from another view-angle.

Refer to FIG. 1A, FIG. 1B and FIG. 1C. The computer case 100 includes a frame 1, a motherboard stand 2 and a motherboard extension stand 3. The frame 1 includes a front plate 11, a rear plate 12, a top plate 13 and a bottom plate 14. The front plate 11 and the rear plate 12 are disposed oppositely and parallel to each other. The top plate 13 and the bottom plate 14 are disposed oppositely and parallel to each other. The front plate 11 and the rear plate 12 are respectively connected between the top plate 13 and the bottom plate 14. Thus, the front plate 11, the rear plate 12, the top plate 13 and the bottom plate 14 may form a hollowed frame, which defines an internal accommodation space 17 of the computer case 100 (illustrated in FIG. 1B). In some embodiments, the computer case 100 may further include an L-shaped shielding plate 18 disposed within the accommodation space 17 of the computer case 100 to divide the accommodation space 17 into a first space 15 and a second space 16. To put it in greater details, the L-shaped shielding plate 18 includes a horizontal portion 181 and a lateral portion 182 connected to the horizontal portion 181. The lateral portion 182, parallel to the motherboard stand 2, is connected to the front plate 11, the rear plate 12 and the bottom plate 14. The horizontal portion 181 is parallel to the top plate 13 and the bottom plate 14, and located between the top plate 13 and the bottom plate 14. Two sides of the horizontal portion 181 are connected to the front plate 11 and the rear plate 12, and the other two sides of the horizontal portion 181 are connected to the motherboard stand 2 and the lateral portion 182. The first space 15 may be defined by the space surrounded by the horizontal portion 181, the lateral portion 182, the bottom plate 14 and the motherboard stand 2. The second space 16 may be defined by the space surrounded by the horizontal portion 181, the top plate 13, the front plate 11 and the rear plate 12. Furthermore, by changing the shape of the shielding plate 18, the first space 15 and the second space 16 may further be interconnected with each other.

Depending on actual needs, one or more than one fan 71 may be installed on the front plate 11, the rear plate 12, the top plate 13 and/or the bottom plate 14 to dissipate the heat source inside the computer case 100 and avoid the electronic elements disposed inside the computer case 100 being temporarily or permanently failed due to the interior of the computer case 100 being over-heated. Illustratively but not restrictively, the size of the one or more than one fan 71 may be 140 mm. In the present embodiment, the top plate 13 may have three 140 mm fans 71 disposed thereon, the front plate 11 may have three 140 mm fans 71 disposed thereon, the rear plate 12 may have a 140 mm fan 71 disposed thereon, and the bottom plate 11 may have two 140 mm fans 71 disposed thereon. In total, the computer case 100 of the present invention may have nine 140 mm fans 71 disposed thereon to increase the thermal convection inside the computer case and produce a better heat-dissipation effect required of professional players. In an embodiment; the rear plate 12 may have a slide rail 121 disposed thereon, such that the fan 71 disposed on the rear plate 12 may slide on the slide rail 121. The user may adjust the position of the fan 71 according to the condition of use. In other embodiments, based on the user's needs, a water cooling kit may be added on the front plate 11, the rear plate 12, the top plate 13 and/or the bottom plate 14.

The motherboard stand 2 is adjacent to the top plate 13 and the rear plate 12 for carrying a motherboard 6, such as a mini-ITX motherboard, an ATX motherboard or an E-ATX motherboard, and the invention is not limited thereto.

The motherboard extension stand 3 is connected to the motherboard stand 2 for carrying some peripheral devices required of the user, such as a hard disc and/or a heat-dissipation device. In the present invention, the installation position of the motherboard extension stand 3 is adjustable, and may be switched between a first position and a second position.

When the motherboard extension stand 3 is located at the first position, the motherboard extension stand 3 is connected between the motherboard stand 2 and the front plate 11. As indicated in FIG. 1A, FIG. 1B and FIG. 10, the position of the motherboard extension stand 3 is illustrated in solid lines. Specifically, when the motherboard extension stand 3 is located at the first position, the motherboard extension stand 3 and the motherboard stand 2 are disposed in parallel, and two sides of the motherboard extension stand 3 are respectively connected to the motherboard stand 2 and the front plate 11. Thus, the motherboard stand 2, the motherboard extension stand 3, the top plate 13, the front plate 11, the rear plate 12 and the horizontal portion 181 may together define the second space 16.

When the motherboard extension stand 3 is located at the second position, the motherboard extension stand 3, located within the second space 16, is parallel to the front plate 11 and the rear plate 12 and located between the front plate 11 and the rear plate 12. As indicated in FIG. 1A, FIG. 1B and FIG. 1C, the position of the motherboard extension stand 3 at the second position is illustrated in dotted lines. Specifically, when the motherboard extension stand 3 is located at the second position, two ends of the motherboard extension stand 3 lean on the top plate 13 and the horizontal portion 181, and one side of the motherboard extension stand 3 is connected to the motherboard stand 2, such that the second space 16 is further divided into a first sub-space 161 and a second sub-space 162. The first sub-space 161 may be defined by the space surrounded by the top plate 13, the front plate 11, the horizontal portion 181 and the motherboard extension stand 3. The first sub-space 161 and the first space 15 may be interconnected with each other. The second sub-space 162 may be defined by the space surrounded by the top plate 13, the rear plate 12, the motherboard stand 2, the horizontal portion 181 and the motherboard extension stand 3. The second sub-space 162 and the first space 15 may be interconnected with each other.

When the motherboard extension stand 3 is located at a position as described above, the motherboard extension stand 3 may be used for carrying different peripheral devices. By changing the assembly position of the motherboard extension stand 3, the peripheral devices required of the user may be installed on the motherboard extension stand 3 according to actual needs.

In the embodiment as indicated in FIG. 1A, FIG. 1B and FIG. 1C, the motherboard extension stand 3 may be detachably connected to the motherboard stand 2. Furthermore, the user needs to detach the motherboard extension stand 3 from the motherboard stand 2, and after the position of the motherboard extension stand 3 is switched (that is, the motherboard extension stand 3 is switched to the second position from the first position.), the motherboard extension stand 3 and the motherboard stand 2 are again connected. However, the present invention is not limited thereto. For example, in another embodiment, the motherboard extension stand 3 may be pivotally connected to the motherboard stand 2 through pivotal connection, such that the motherboard extension stand 3 may be switched between the first position and the second position.

Figure 2A:
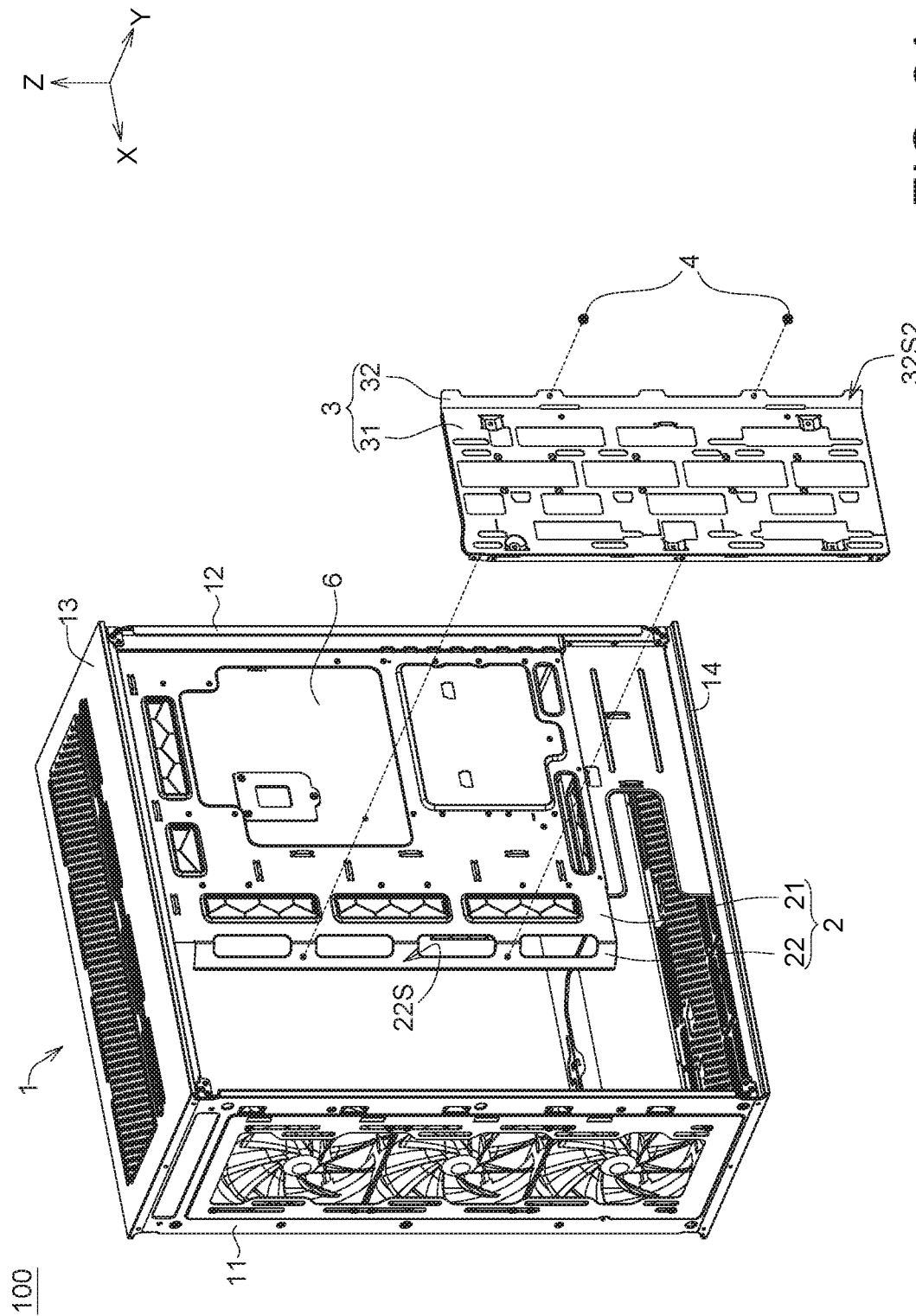
FIG. 2A is an explosion diagram of a motherboard extension stand of a computer case at a first position viewed from a view-angle according to an embodiment of the invention.
Figure 2B:
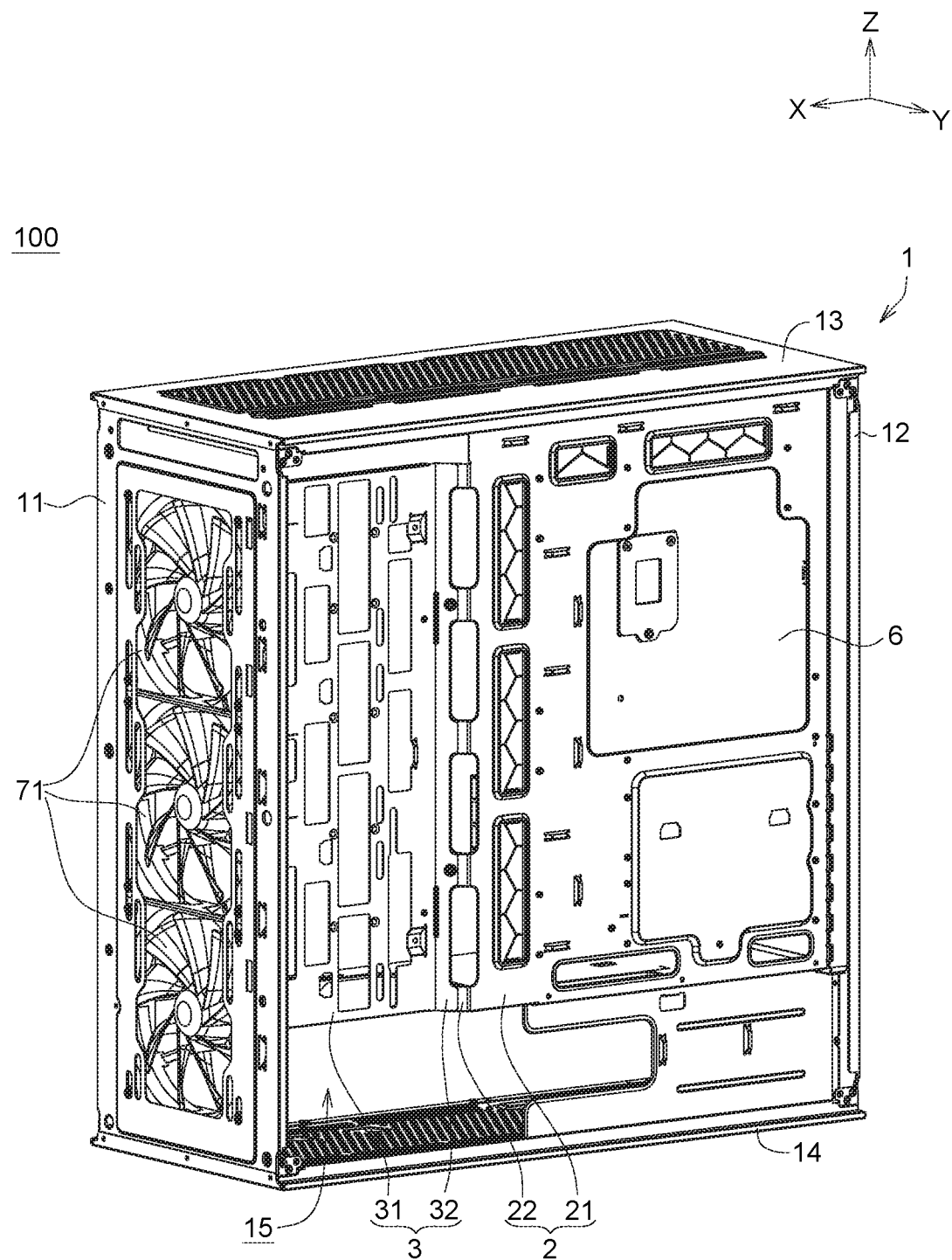
FIG. 2B is an assembly diagram of the computer case of FIG. 2A.
Figure 2C:
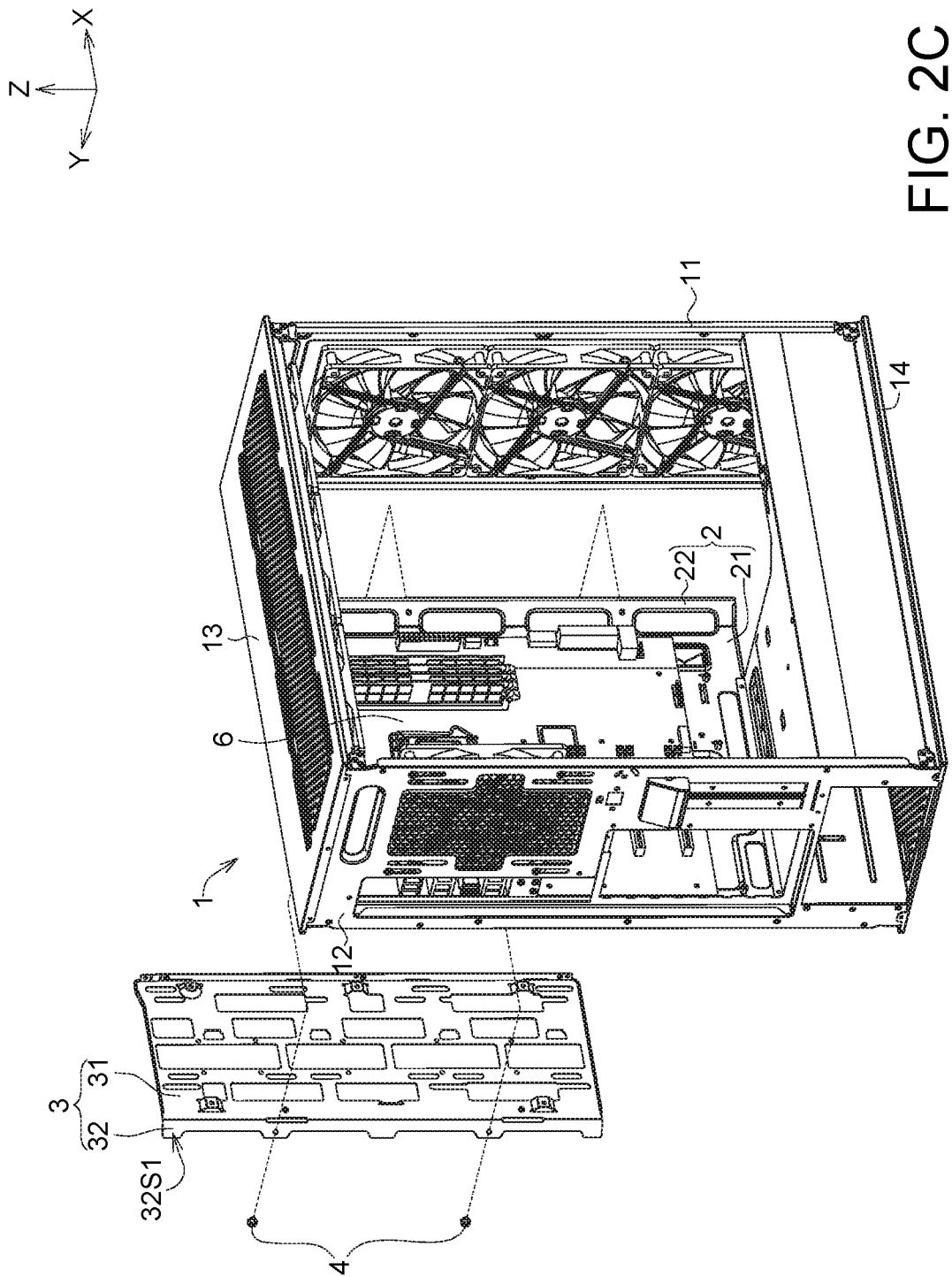
FIG. 2C is an explosion diagram of the computer case of FIG. 2A viewed from another view-angle.
Figure 2D:
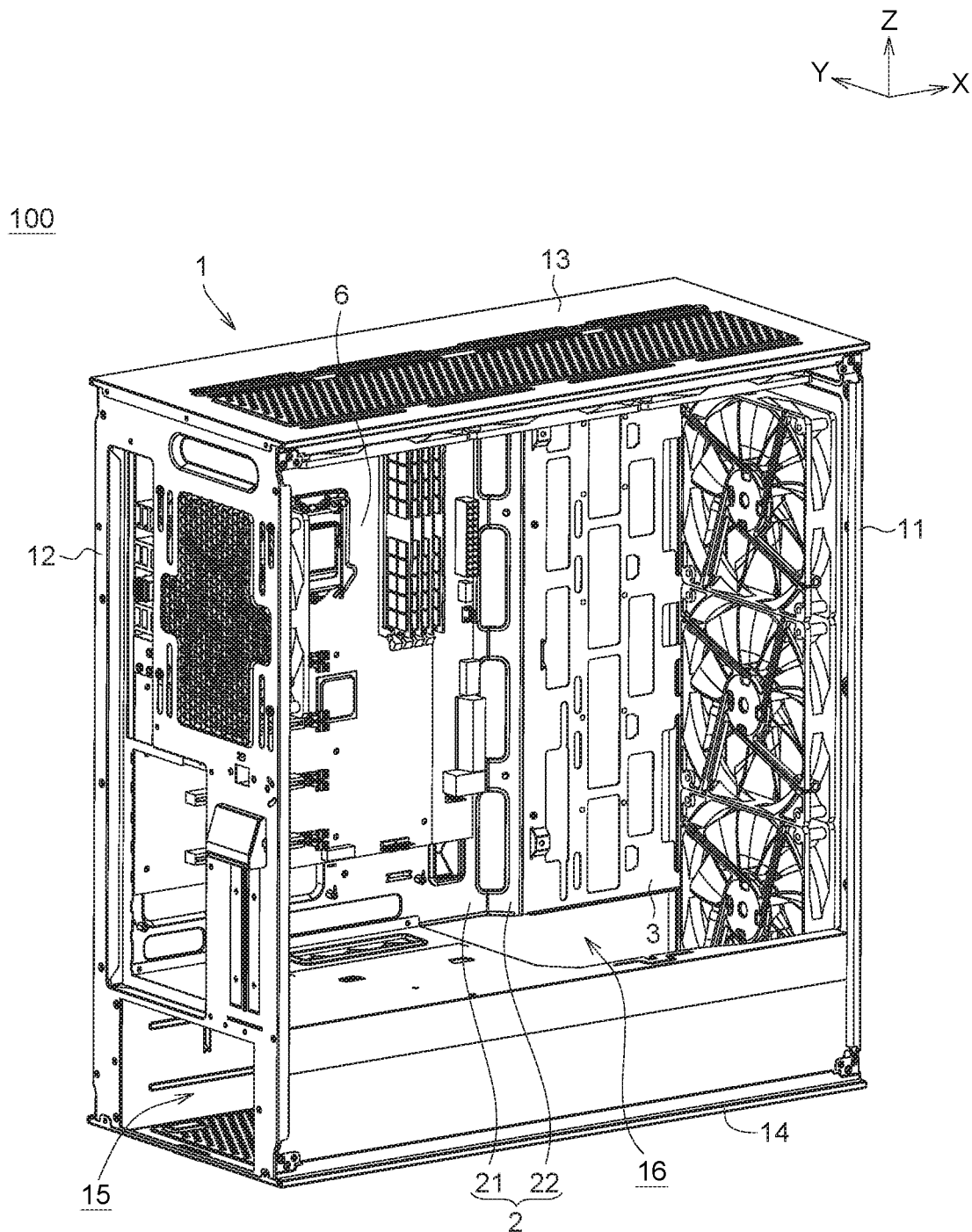
FIG. 2D is an assembly diagram of the computer case of FIG. 2C.

FIG. 2A is an explosion diagram of a motherboard extension stand 3 of a computer case 100 at a first position viewed from a view-angle according to an embodiment of the invention. FIG. 2B is an assembly diagram of the computer case 100 of FIG. 2A. FIG. 2C is an explosion diagram of the computer case 100 of FIG. 2A viewed from another view-angle. FIG. 2D is an assembly diagram of the computer case 100 of FIG. 2C.

Refer to FIG. 2A, FIG. 2B, FIG. 2C and FIG. 2D which clearly illustrate how the motherboard extension stand 3 at the first position is connected to the motherboard stand 2, The motherboard stand 2 may include a stand body 21 and a first lapped portion 22 connected to the stand body 21. The first lapped portion 22 is formed by folding up a lateral side of the motherboard stand 2 to an angle of such as 45°. The first lapped portion 22 includes a lapped surface 22S, which is a surface of the first lapped portion 22 that is connected to the stand body 21 at an angle of 45°.

The motherboard extension stand 3 may include an extension stand body 31 and a second lapped portion 32 connected to the extension stand body 31. The second lapped portion 32 is formed by folding up a lateral side of the motherboard extension stand 3 to an angle of such as 45°. The second lapped portion 32 includes a first surface 32S1 and a second surface 32S2. The first surface 32S1 and the second surface 32S2 are two opposite surfaces of the second lapped portion 32. The first surface 32S1 is a surface of the second lapped portion 32 that is connected to the extension stand body 31 at an angle of 45°. The second surface 32S2 is a surface of the second lapped portion 32 that is connected to the extension stand body 31 at an angle of 135°.

When the user wants to install the motherboard extension stand 3 at the first position, the user may arrange the first surface 32S1 of the second lapped portion 32 of the motherboard extension stand 3 to face the lapped surface 22S of the first lapped portion 22 of the motherboard stand 2, and then fasten the second lapped portion 32 and the first lapped portion 22 with a fixing element 4. The fixing element 4 may be realized by a screw or any elements capable of making the motherboard extension stand 3 detachably connected to the motherboard stand 2 without damaging the structure thereof. When the motherboard extension stand 3 is located at the first position, the first surface 32S1 of the second lapped portion 32 of the motherboard extension stand 3 overlaps the lapped surface 22S of the first lapped portion 22 of the motherboard stand 2.

Figure 3:
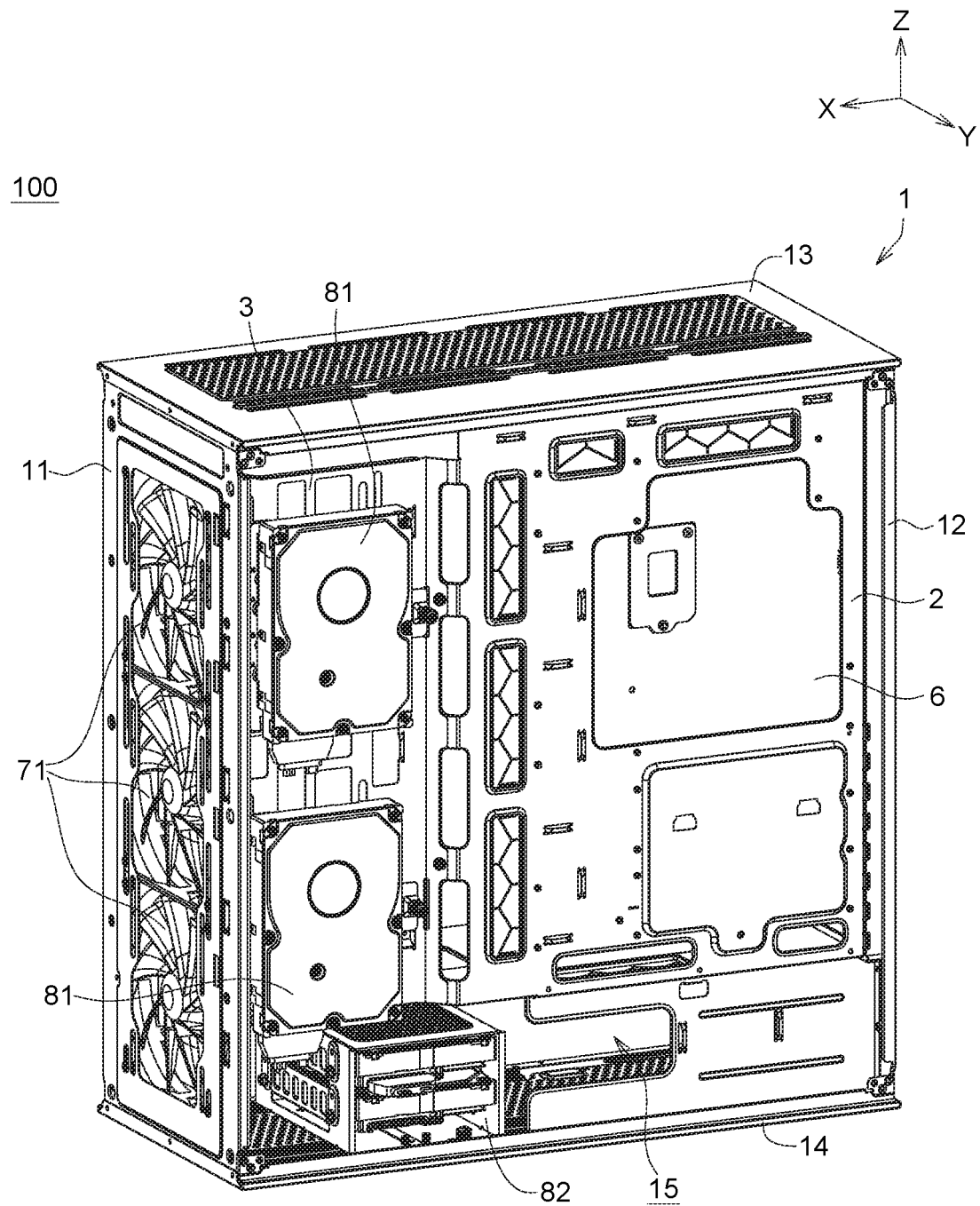
FIG. 3 is a schematic diagram of the computer case of FIG. 2A whose motherboard extension stand is located at the first position with hard discs installed thereon.

FIG. 3 is a schematic diagram of the computer case 100 of FIG. 2A whose motherboard extension stand 3 is located at a first position with hard discs 81 installed thereon. Refer to FIG. 3. If the user needs to install a hard disc, such as but not limited to a 3.5" or 2.5" hard disc, the user may install a hard disc 81 on the motherboard extension stand 3 at the first position. Furthermore, in an embodiment, the user may choose to install a hard disc group 82 on the bottom plate 14, such that the hard disc group 82 is installed within the first space 15. The hard disc group 82 may be fixed on the bottom plate 14 using screws. In another embodiment, the bottom plate 14 may have a slide rail on which the hard disc group 82 may slide to any position of the bottom plate 14. Thus, the user may freely adjust the installation position of the hard disc group 82 according to the space design.

Figure 4A:
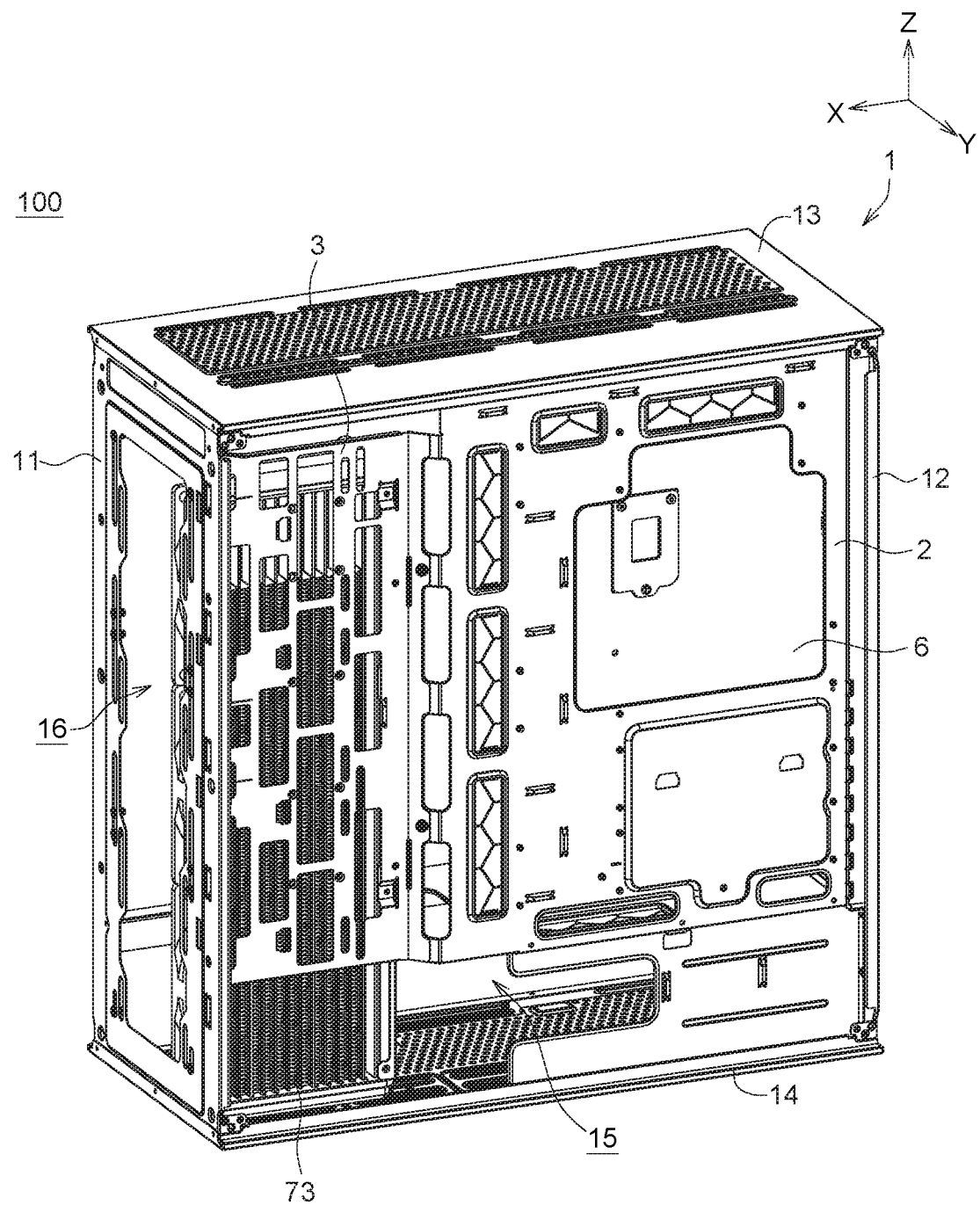
FIG. 4A is a schematic diagram of the computer case of FIG. 2A whose motherboard extension stand is located at the first position with fans and a water cooling kit installed thereon.
Figure 4B:
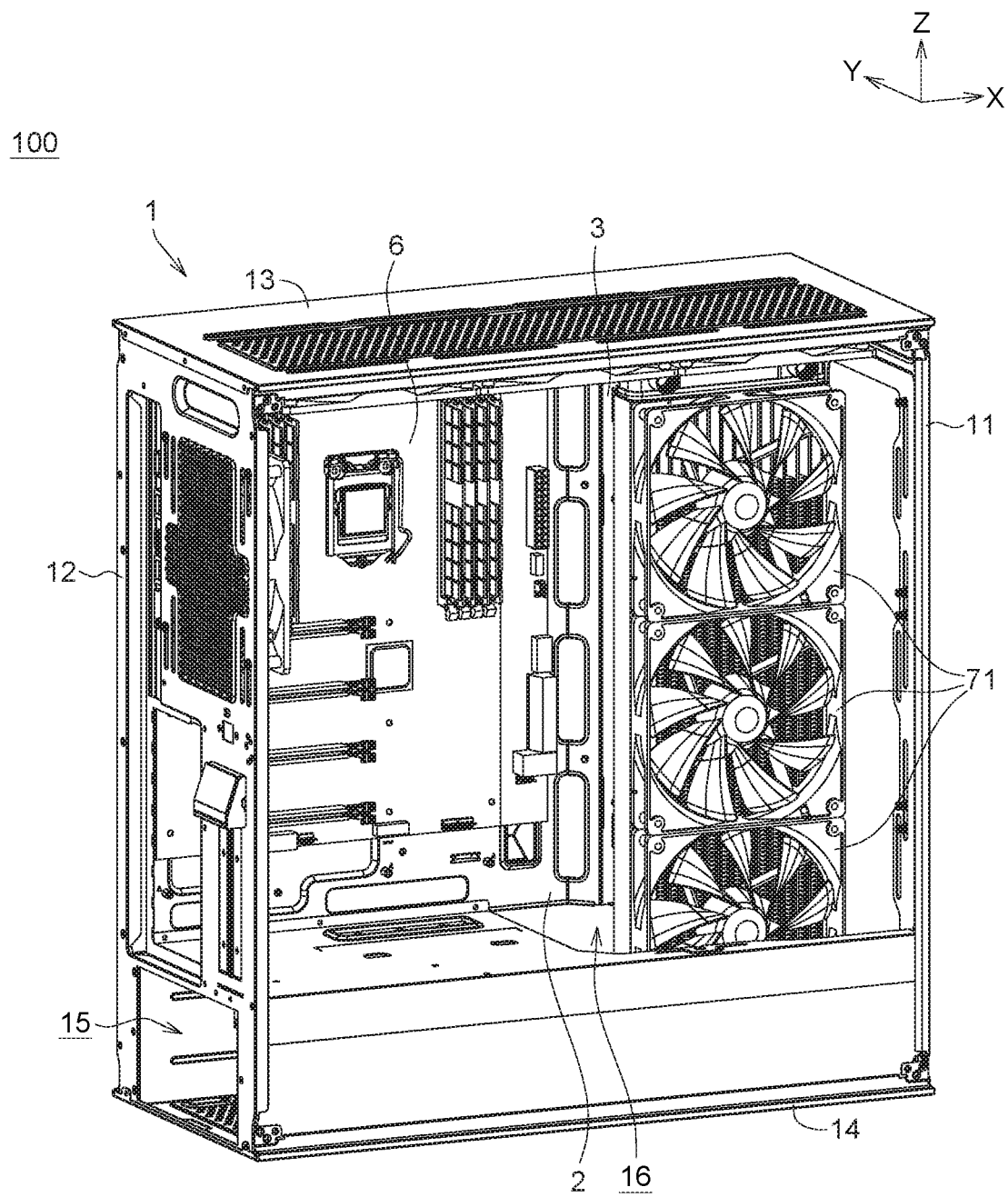
FIG. 4B is a schematic diagram of the computer case of FIG. 4A viewed from another view-angle.

FIG. 4A is a schematic diagram of the computer case 100 of FIG. 2A whose motherboard extension stand 3 is located at a first position with fans 71 and a water cooling kit 73 installed thereon. FIG. 4B is a schematic diagram of the computer case 100 of FIG. 4A viewed from another view-angle. Refer to FIG. 4A and FIG. 4B. If the user has a requirement for dissipating the heat, the user may install fans 71 and a water cooling kit 73 on the motherboard extension stand 3 at the first position, such that the fans 71 and the water cooling kit 73 are installed within the first space 15 and the second space 16. Besides, if the user has the requirements for installing a hard disc and dissipating the heat, the user may install the hard disc group 82 as shown in FIG. 3 on the bottom plate 14 within the first space 15.

Figure 5A:
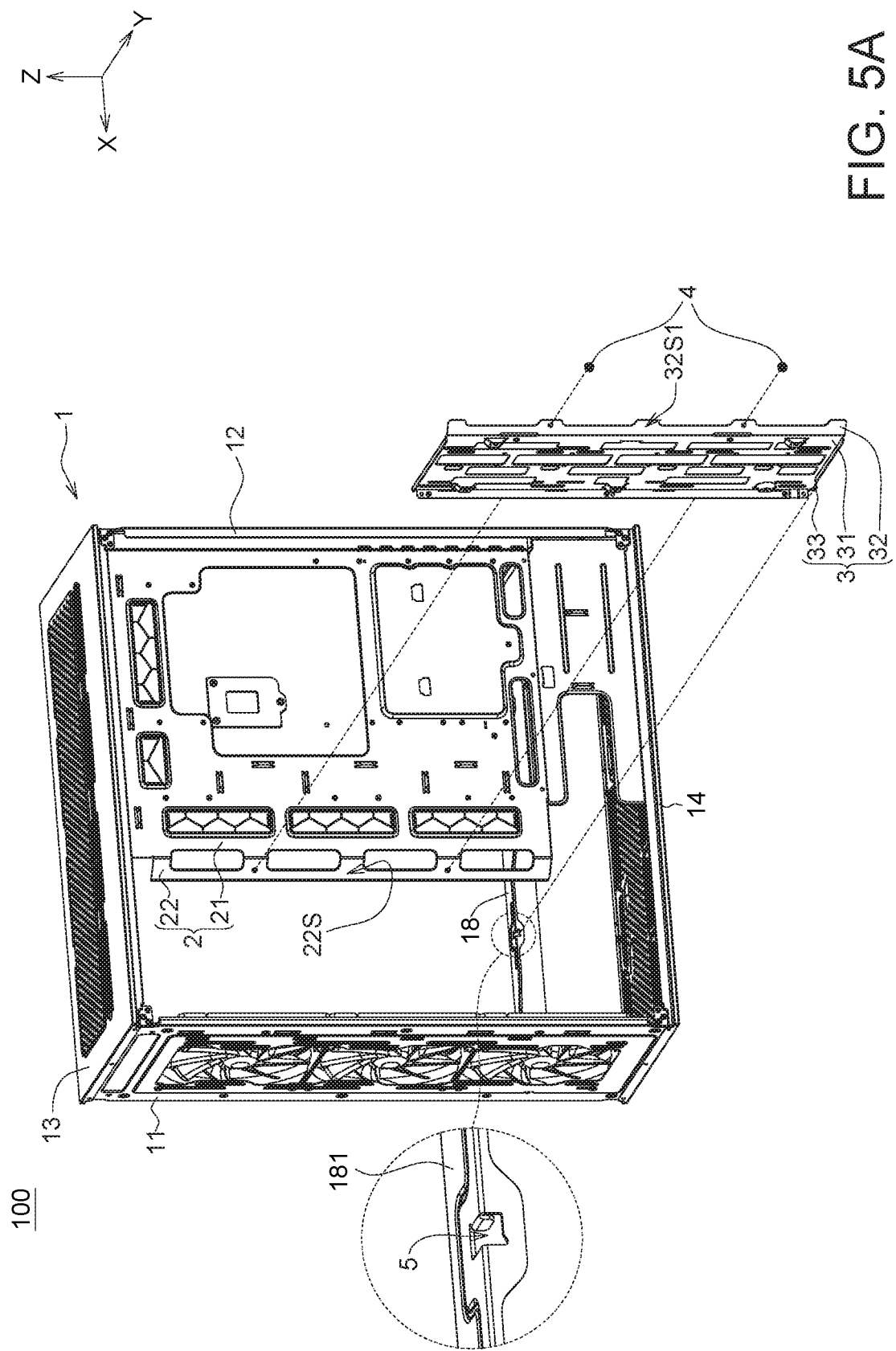
FIG. 5A is an explosion diagram of a motherboard extension stand of a computer case at a second position viewed from a view-angle according to another embodiment of the invention.
Figure 5B:
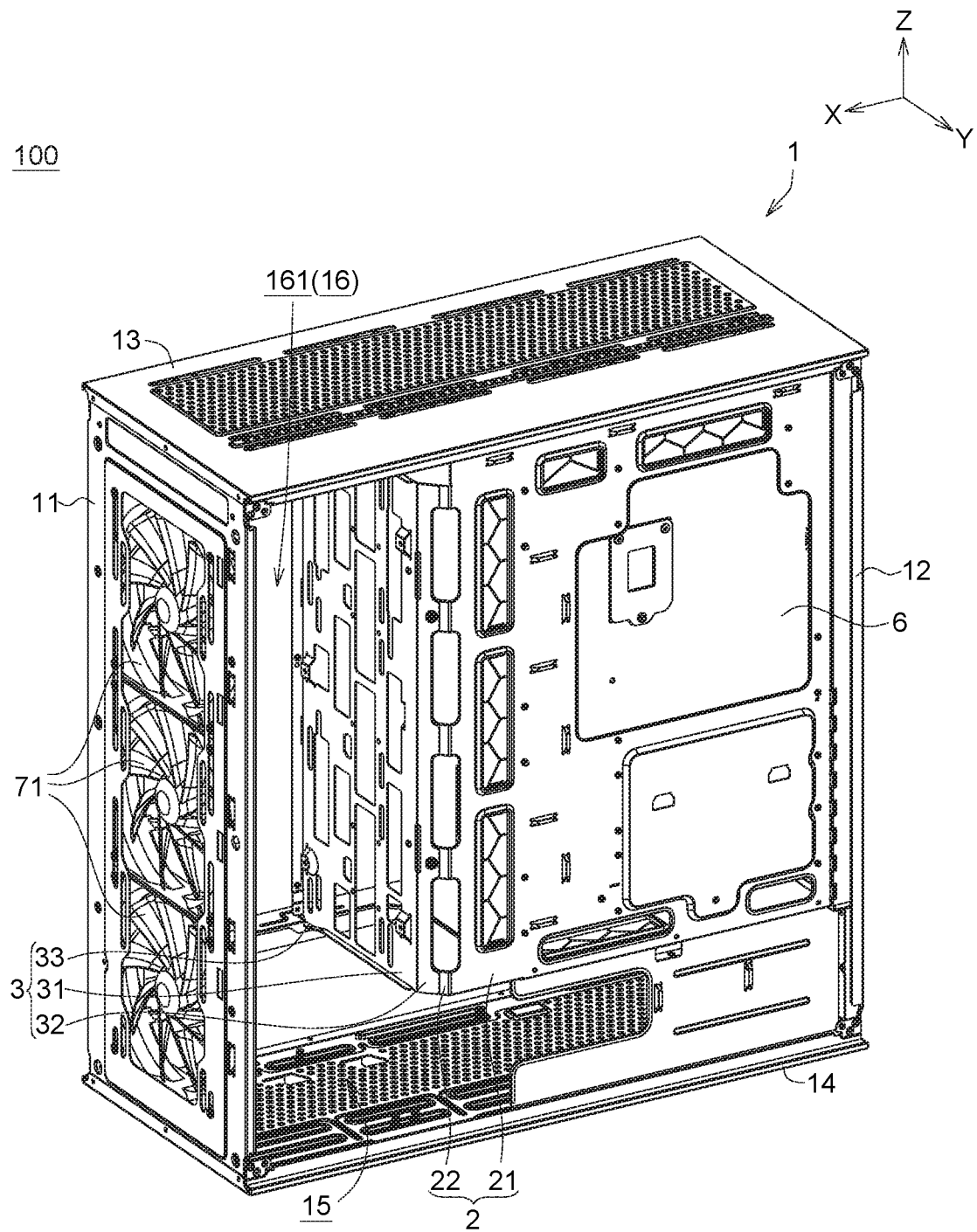
FIG. 5B is an assembly diagram of the computer case of FIG. 5A.
Figure 5C:
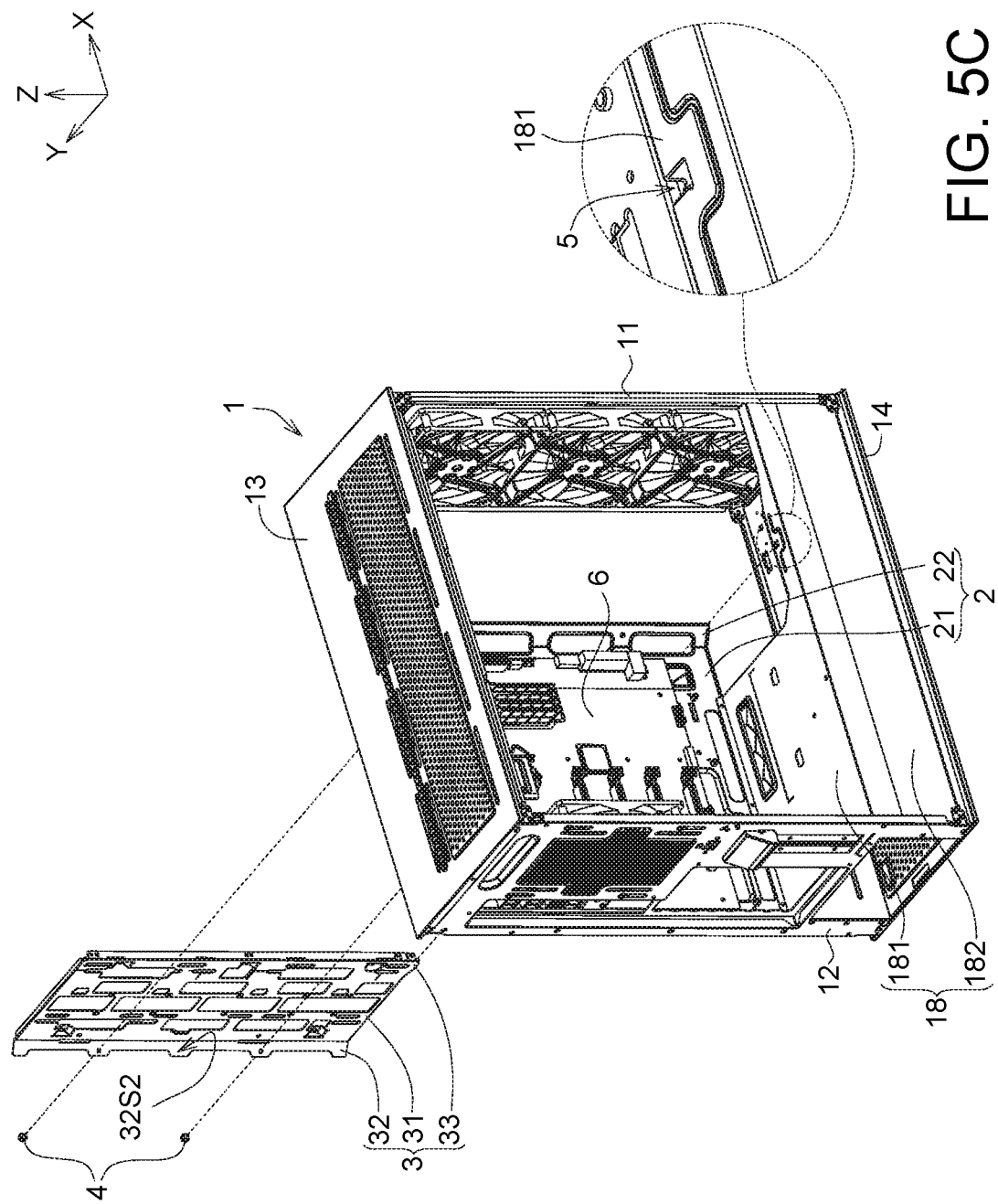
FIG. 5C is an explosion diagram of the computer case of FIG. 5A viewed from another view-angle.
Figure 5D:
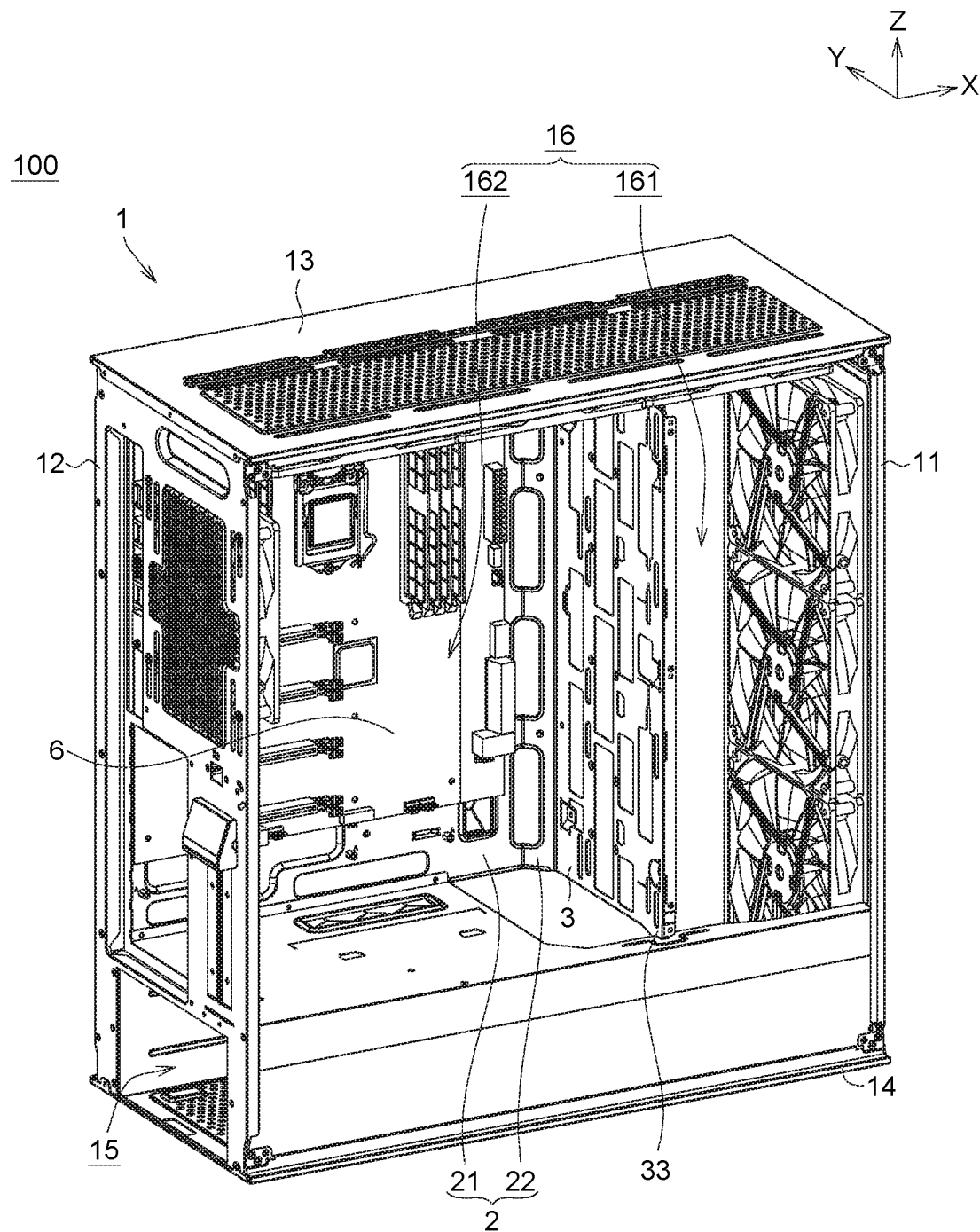
FIG. 5D is an assembly diagram of the computer case of FIG. 5O.

FIG. 5A is an explosion diagram of a motherboard extension stand 3 of a computer case 100 at a second position viewed from a view-angle according to another embodiment of the invention. FIG. 5B is an assembly diagram of the computer case 100 of FIG. 5A. FIG. 5C is an explosion diagram of the computer case 100 of FIG. 5A viewed from another view-angle. FIG. 5D is an assembly diagram of the computer case 100 of FIG. 5C.

Refer to FIG. 5A, FIG. 5B, FIG. 5C and FIG. 5D which clearly illustrate how the motherboard extension stand 3 at the second position is connected to the motherboard stand 2. When the motherboard extension stand 3 is switched to the second position from the first position, the user may detach the motherboard extension stand 3 from the motherboard stand 2 by removing the fixing element 4 (such as a screw). Then, the motherboard extension stand 3 is flipped upside down for 180°. As indicated in FIG. 5A and FIG. 5C, the motherboard extension stand 3 may include a protrusion portion 33, which is protruded towards the negative Z axis from the extension stand body 31 and is located on one side of the extension stand body 31 facing the negative Y axis. The computer case 100 includes an engaging portion 5 corresponding to the protrusion portion 33, such as a recess corresponding to the shape of the protrusion portion 33. Illustratively but not restrictively, the engaging portion 5 may be disposed on the horizontal portion 181 of the shielding plate 18, but the invention is not limited thereto. For example, the engaging portion 5 may selectively be disposed on other structure of the computer case 100 not mentioned above, After the motherboard extension stand 3 is flipped upside down for 180°, the protrusion portion 33 which originally faces the top plate 13 will change to face the bottom plate 14, and the second surface 32S2 of the second lapped portion 32 of the motherboard extension stand 3 faces the lapped surface 22S of the first lapped portion 22 of the motherboard stand 2. At this time, the user may lean the second surface 32S2 on the lapped surface 22S and couple the second lapped portion 32 and the first lapped portion 22 with the fixing element 4, and the protrusion portion 33 may be engaged in the engaging portion 5. Thus, the motherboard extension stand 3 is disposed at the second position, and the second surface 32S2 of the second lapped portion 32 of the motherboard extension stand 3 overlaps the lapped surface 22S of the first lapped portion 22 of the motherboard stand 2.

Figure 6A:
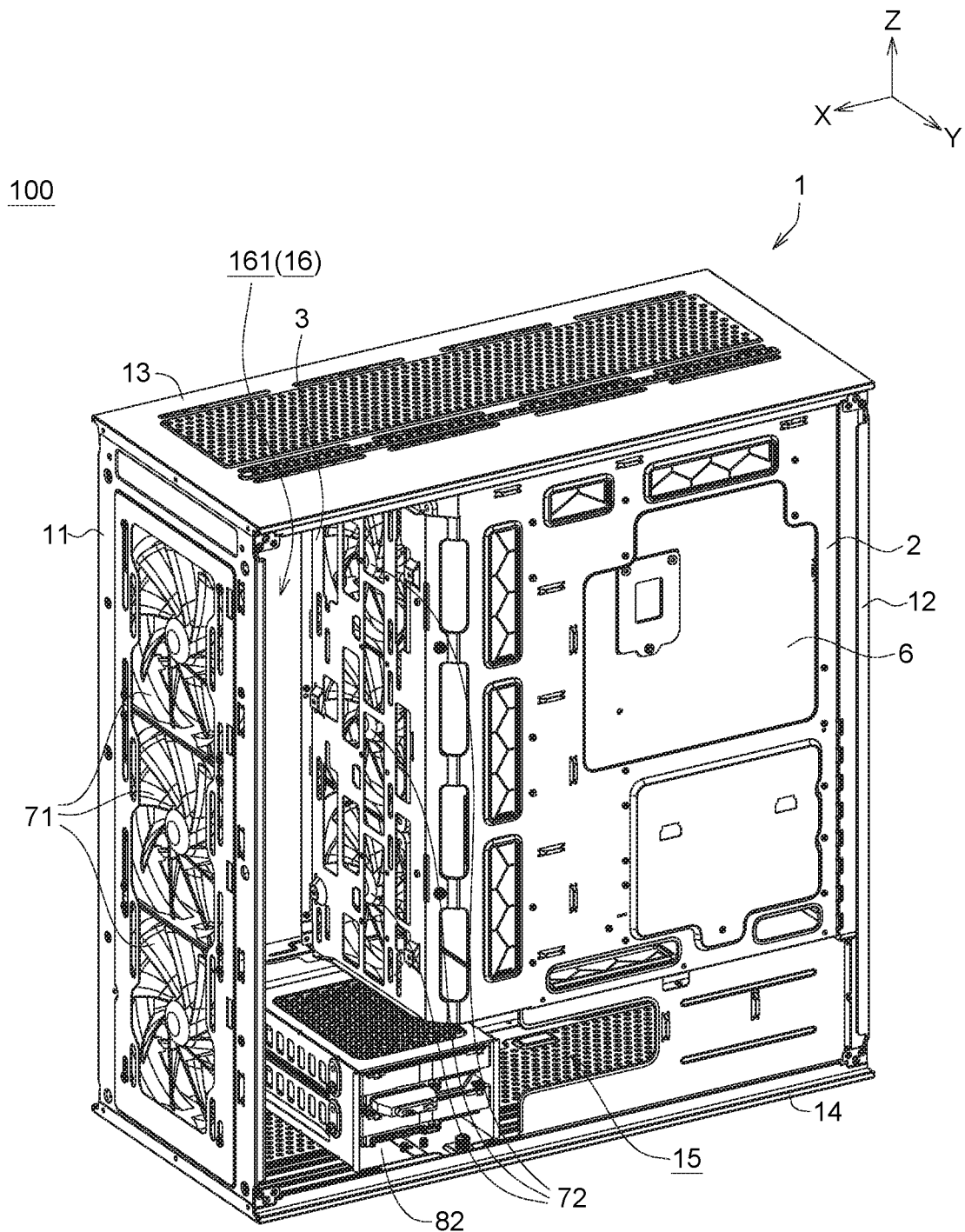
FIG. 6A is a schematic diagram of the computer case of FIG. 5A whose motherboard extension stand is located at the second position with fans installed thereon.
Figure 6B:
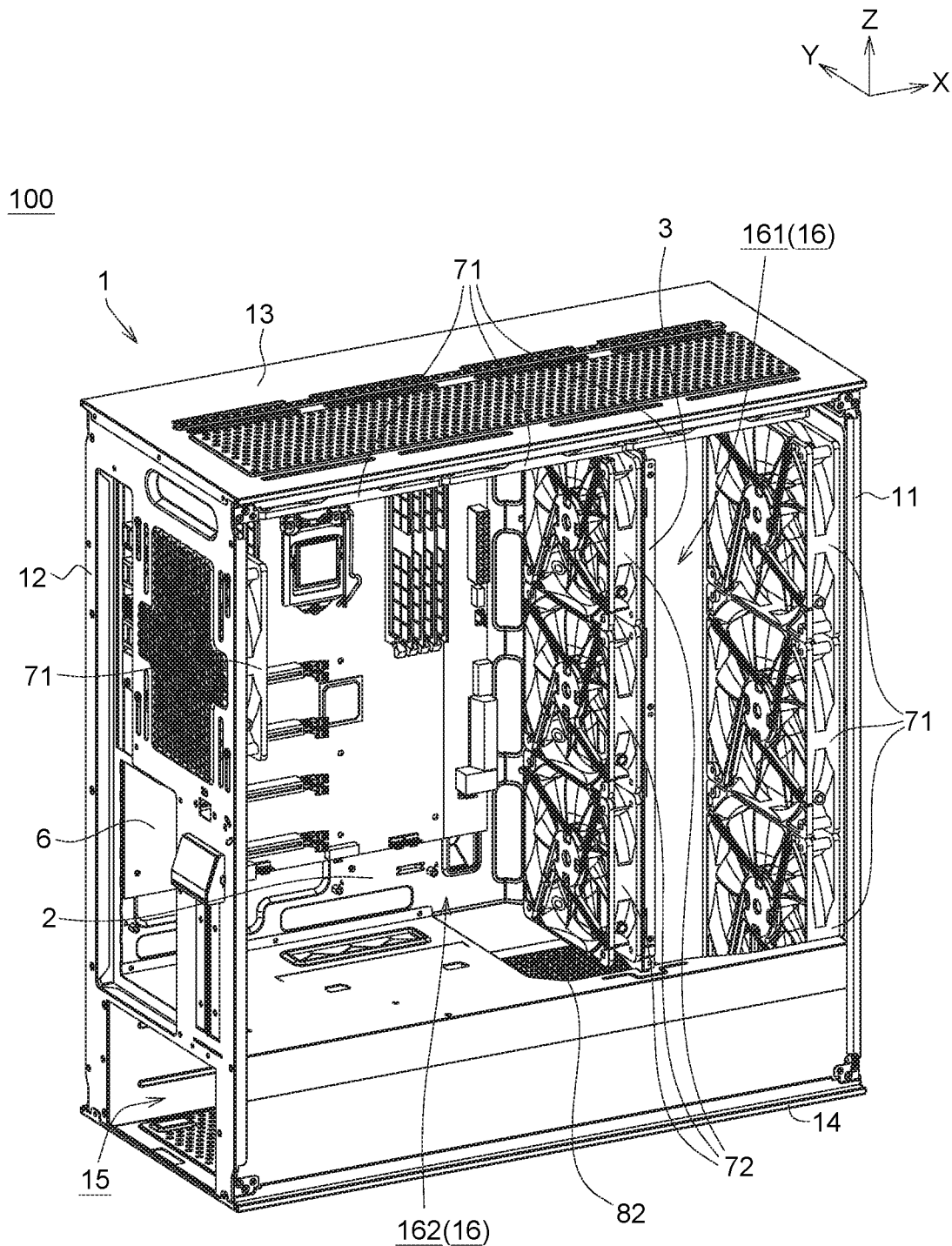
FIG. 6B is a schematic diagram of the computer case of FIG. 6A viewed from another view-angle.

FIG. 6A is a schematic diagram of the computer case 100 of FIG. 5A whose motherboard extension stand 3 is located at a second position with fans 72 installed thereon. FIG. 6B is a schematic diagram of the computer case 100 of FIG. 6A viewed from another view-angle. Refer to FIG. 6A and FIG. 6B. If the user has a requirement for dissipating the heat, one or more than one fan 72, such as but not limited to a 120 mm fan, may be disposed on the motherboard extension stand 3 at the second position. As indicated in FIG. 6B, the fans 72 are installed within the second sub-space 162 to blow an airflow towards the heating elements disposed on the motherboard 6 (such as the central processing unit, graphics processor, and memory) to enhance the convection around the motherboard 6, such that the heat flow generated by the heating elements may be dissipated via the fans 71 disposed on the rear plate 12 and the top plate 13 to quickly dissipate the heat.

Figure 7:
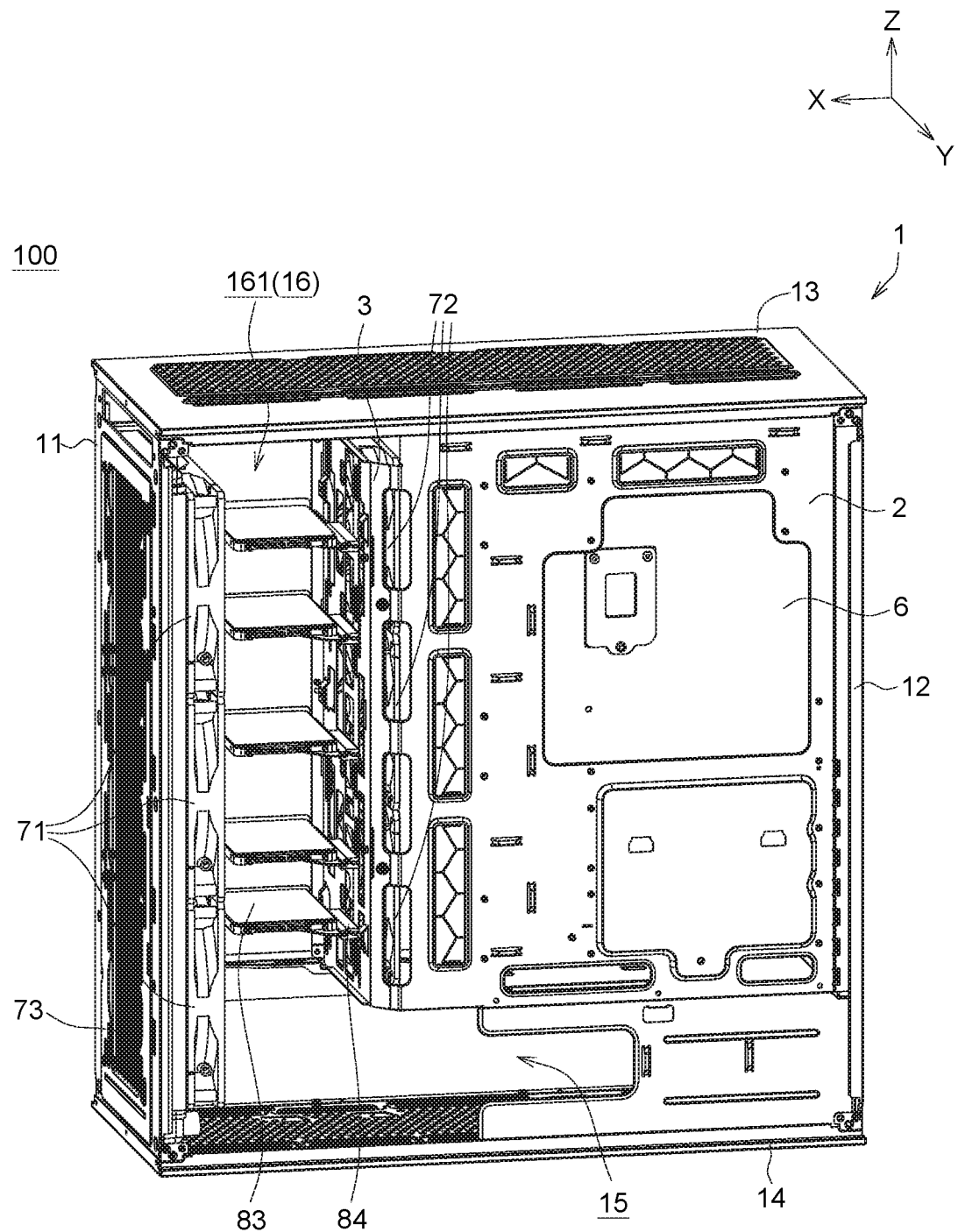
FIG. 7 is a schematic diagram of the computer case of FIG. 5A whose motherboard extension stand is located at a second position with hard discs installed thereon.

Besides, if the user has the requirements for installing a hard disc and dissipating the heat, the user may install the hard disc group 82 as shown in FIG. 3 on the bottom plate 14 within the first space 15. Referring to FIG. 7, a schematic diagram of the computer case 100 of FIG. 5A whose motherboard extension stand 3 at a second position with hard discs 83 installed thereon is shown. The user may install one or more than one hard disc 83 on the motherboard extension stand 3 at the second position. The hard discs 83 are disposed within the first sub-space 161, such that the existing space within the computer case 100 may be effectively utilized, To put it in greater details, the motherboard extension stand 3 further includes an installation stand 84 disposed within the first sub-space 161 and parallel to the top plate 13 and the bottom plate 14. The hard discs 83 may be installed on the installation stand 84. In the present embodiment, five installation stands 84 are arranged to carry five hard discs 83. In the present embodiment, the fans 71 and the water cooling kit 73 are installed on the front plate 11, and the fans 71 and the water cooling kit 73 are installed within the first space 15 and the first sub-space 161 of the second space 16, but the present invention is not limited thereto. Thus, since the airflow may enter the computer case 100 from the front plate 11, the air pressure between the front plate 11 and the motherboard extension stand 3 is increased, and the airflow may be accelerated to quickly dissipate the heat.

Figure 8:
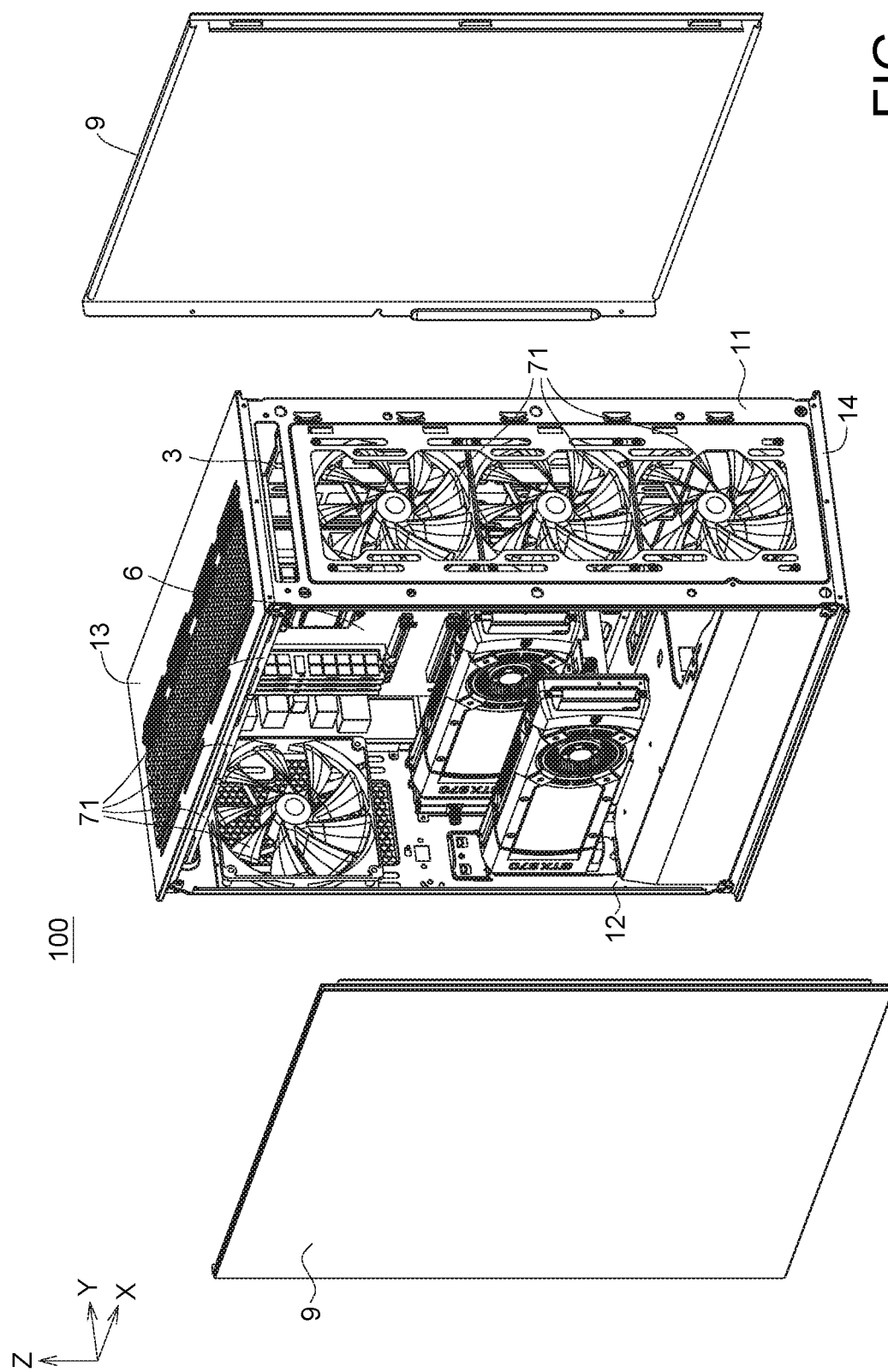
FIG. 8 is an explosion diagram of a computer case in which two sides of the frame are covered with glass covers according to an embodiment of the invention.

Referring to FIG. 8, an explosion diagram of a computer case 100 in which two sides of the frame 1 are covered with glass covers according to an embodiment of the invention is shown. After the user completes the installation of the internal electronic elements (such as the motherboard, the graphics card, the power) and the peripheral devices (such as the hard disc and the fan) of the computer case 100, the glass covers 9 may be disposed on the left side and the right side of the frame 1 of the computer case 100 to be adjacent to the front plate 11, the rear plate 12, the top plate 13 and the bottom plate 14. The glass covers 9 reveal the internal view of the computer case 100 and produce a unique assembly style of professional players.

According to the computer case of the invention, by changing the assembly position of the motherboard extension stand, the user may install necessary peripheral devices on the motherboard extension stand without using additional fixing stands.

Besides, when the motherboard extension stand is located at different assembly positions (such as the first position and the second position), the motherboard extension stand may be used for carrying several peripheral devices. In some embodiments, the motherboard extension stand may be used for carrying not only the hard disc but also the heat-dissipation device. Or, the motherboard extension stand may be used for carrying both of the hard disc and the heat-dissipation device. Therefore, the computer case of the invention may meet the user's various requirements.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer case comprising: a frame comprising a front plate, a rear plate, a top plate and a bottom plate, wherein the front plate and the rear plate are disposed oppositely and parallel to each other, the top plate and the bottom plate are disposed oppositely and parallel to each other, and the front plate and the rear plate are respectively connected between the top plate and the bottom plate; a motherboard stand adjacent to the top plate and the rear plate; and a motherboard extension stand connected to the motherboard stand, wherein the motherboard extension stand has a first position or a second position; wherein when the motherboard extension stand is located at the first position, the motherboard extension stand and the motherboard stand are disposed in parallel, and two sides of the motherboard extension stand are respectively connected to the motherboard stand and the front plate; when the motherboard extension stand is located at the second position, the motherboard extension stand is parallel to the front plate and the rear plate, and located between the front plate and the rear plate, wherein the motherboard stand and the motherboard extension stand respectively comprise a first lapped portion and a second lapped portion bending at lateral sides, the first lapped portion comprises a lapped surface, and the second lapped portion comprises a first surface and a second surface opposite to each other; wherein when the motherboard extension stand is located at the first position, the first surface overlaps the lapped surface; when the motherboard extension stand is located at the second position, the second surface overlaps the lapped surface.

2. The computer case according to claim 1, wherein when the motherboard extension stand is located at the first position, the motherboard extension stand is configured to carry a hard disc or a heat-dissipation device; when the motherboard extension stand is located at the second position, the motherboard extension stand is configured to carry the hard disc and/or the heat-dissipation device.

3. The computer case according to claim 1, wherein the motherboard extension stand is rotatably and pivotally connected to the motherboard stand.

4. The computer case according to claim 1, further comprising a fixing element, wherein when the first surface overlaps the lapped surface or when the second surface overlaps the lapped surface, the second lapped portion and the first lapped portion are attached with the fixing element.

5. The computer case according to claim 1, further comprising an L-shaped shielding plate, the frame defines an accommodation space, and the shielding plate is disposed in the accommodation space and divides the accommodation space into a first space and a second space.

6. The computer case according to claim 5, wherein the L-shaped shielding plate comprises a horizontal portion and a lateral portion, the horizontal portion, the lateral portion, the bottom plate and the motherboard stand define the first space, a hard disc group is located in the first space, and the bottom plate is further configured to carry the hard disc group.

7. The computer case according to claim 6, wherein the first space is surrounded by the horizontal portion, the lateral portion, the bottom plate and the motherboard stand.

8. The computer case according to claim 6, wherein the second space is surrounded by the horizontal portion, the top plate, the front plate and the rear plate.

9. The computer case according to claim 8, wherein the second space is further divided into a first sub-space and a second sub-space, the first sub-space is surrounded by the top plate, the front plate, the horizontal portion and the motherboard extension stand, and the second sub-space is surrounded by the top plate, the rear plate, the motherboard stand, the horizontal portion and the motherboard extension stand.

10. The computer case according to claim 6, wherein the shielding plate further comprises an engaging portion on the horizontal portion, and the motherboard extension stand further comprises a protrusion portion corresponding to the engaging portion;
    wherein when the motherboard extension stand is located at the first position, the protrusion portion faces the top plate of the frame;
    when the motherboard extension stand is located at the second position, the protrusion portion faces the bottom plate of the frame and is disposed in the engaging portion.

11. The computer case according to claim 1, further comprising two glass covers respectively disposed on a left side and a right side of the frame and adjacent to the front plate, the rear plate, the top plate and the bottom plate.

12. The computer case according to claim 1, wherein when the motherboard extension stand is located at the second position, the motherboard extension stand further comprises at least one installation stand parallel to the top plate and the bottom plate for carrying at least one hard disc.

13. The computer case according to claim 1, wherein the rear plate comprises a slide rail for a heat-dissipation device slidably disposed thereon.

14. The computer case according to claim 1, wherein the bottom plate comprises a slide rail for a hard disc group slidably disposed thereon.

* * * * *